Sept. 4, 1962 J. C. TROTTER 3,052,505
HYDROSTATIC BEARING SYSTEM
Filed April 11, 1961 2 Sheets-Sheet 1
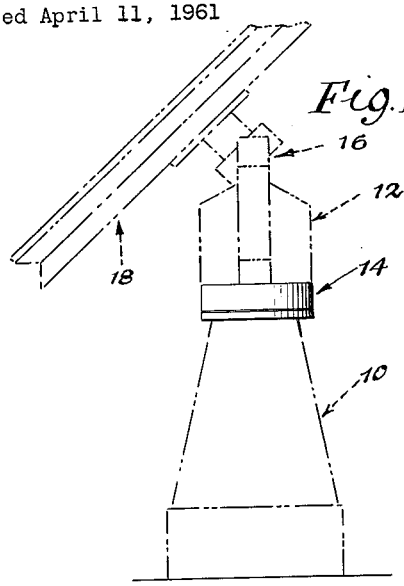
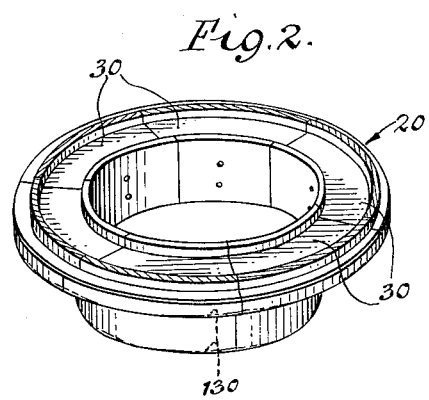
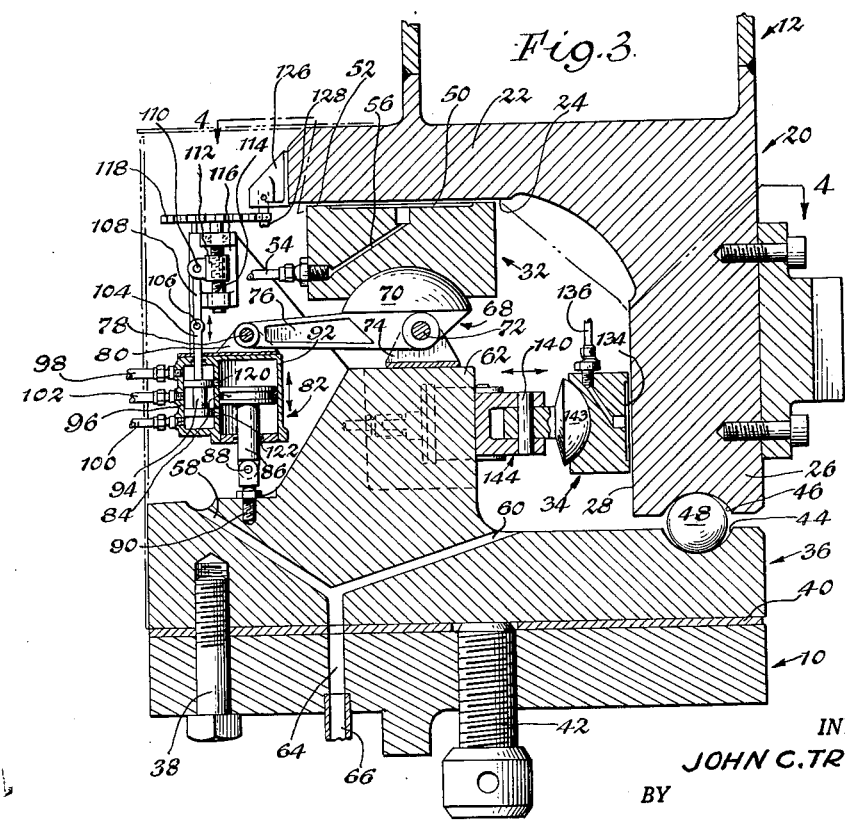
INVENTOR.
JOHN C. TROTTER
BY
Bean, Brooks, Buckley + Bean
ATTORNEYS Sept. 4, 1962 J. C. TROTTER 3,052,505
HYDROSTATIC BEARING SYSTEM
Filed April 11, 1961 2 Sheets-Sheet 2

INVENTOR.
JOHN C. TROTTER
BY
Bean, Brooks, Buckley + Bean
ATTORNEYS

3,052,505
HYDROSTATIC BEARING SYSTEM
John C. Trotter, Williamsville, N.Y., assignor to Bell Aerospace Corporation, Wheatfield, N.Y.
Filed Apr. 11, 1961, Ser. No. 102,237
7 Claims. (Cl. 308—160)

This invention relates in general to hydrostatic bearing systems and pertains more particularly to improvements therein utilizing an alignment compensating mechanism to accommodate for misalignments or distortions of the bearing mechanism which occur incidental to assembly of the various sections of the same when erected at the installation site.

In utilizing hydrostatic bearings to support massive structure it may be necessary to construct a hydrostatic bearing having a relatively large diameter, so large in fact, that the bearing cannot be transported. For example, the race of a hydrostatic bearing for supporting a radar scope for rotation about the vertical azimuth axis may be required to be of a diameter of say forty feet. It will be appreciated that such a bearing must of necessity be made and transported in sections and assembled at the site of installation. At the same time, it will also be appreciated that such a bearing would require extreme accuracy in its assembly during installation in order to achieve and establish a sufficiently accurate radar scope supporting base as to eliminate substantially all errors in operation of the scope due to misalignment or distortion of the bearing sections. That is to say, the sectioned or segmentalized bearing, when assembled, would, under optimum conditions, provide an absolutely flat and horizontally disposed bearing surface so that no errors in elevation of the scope would occur as a result of rotation of the mechanism about the vertical azimuth axis. However, with a bearing of such diameter, it is virtually impossible to erect the same at the site without the introduction of at least a small amount of misalignment and distortion such as would render the bearing structure incapable of producing the accuracy desired, regardless of the care taken in the fabrication of the separate sections. It is therefore of primary concern in connection with the present invention to provide an improved bearing assembly of the type generally described above wherein mechanism is incorporated therein for compensating for misalignments and distortions of sectionalized bearings occasioned by their erection or assembly so as to virtually eliminate operational errors of the nature described.

More specifically, it is an object of the present invention to provide an alignment compensating system for hydrostatic bearings incorporating a series of individual pad members arranged in circular fashion and cooperable with an annular bearing surface formed from a plurality of sections joined together and wherein the pads are so controlled by compensating means as to be adjustably positioned relative to the annular bearing surface and thereby accommodate for misalignment or distortion of the several sections.

A further object of the present invention resides in the provision of an assembly as above described wherein the pads are supported by rocker arm members having semi-circular surfaces engaging the bearing pads and wherein the rocker arms are pivoted about axes displaced from the center of curvature of the semi-circle surfaces whereby pivotal motion of the rocker arms will impart movement to the bearing pads in a direction normal to the bearing support surfaces thereof.

Further, the present invention contemplates a system in accordance with the preceding objects wherein the pivotal motion of the rocker arms is controlled by hydraulic mechanism actuated in response to rotation of the sectioned bearing member relative to the pads in such manner as to compensate for deviations or misalignments in the sectioned member.

The foregoing and other objects, advantages and characterizing features of my invention will become clearly apparent from the ensuing detailed description of one, illustrative embodiment thereof, taken in conjunction with the accompanying drawing illustrating the same wherein like reference numerals denote like parts in each view, and wherein:

FIG. 1 is an elevational view showing in phantom lines a radar scope installation showing in full lines the hydrostatic bearing system in accordance with the present invention;

FIG. 2 is a perspective view of the sectioned bearing member and illustrating, in dotted lines therein, exaggerated misalignment as may be occasioned therein due to assembly of the separate sections thereof;

FIG. 3 is an enlarged vertical section taken through the bearing assembly in accordance with the present invention;

Figure 4:
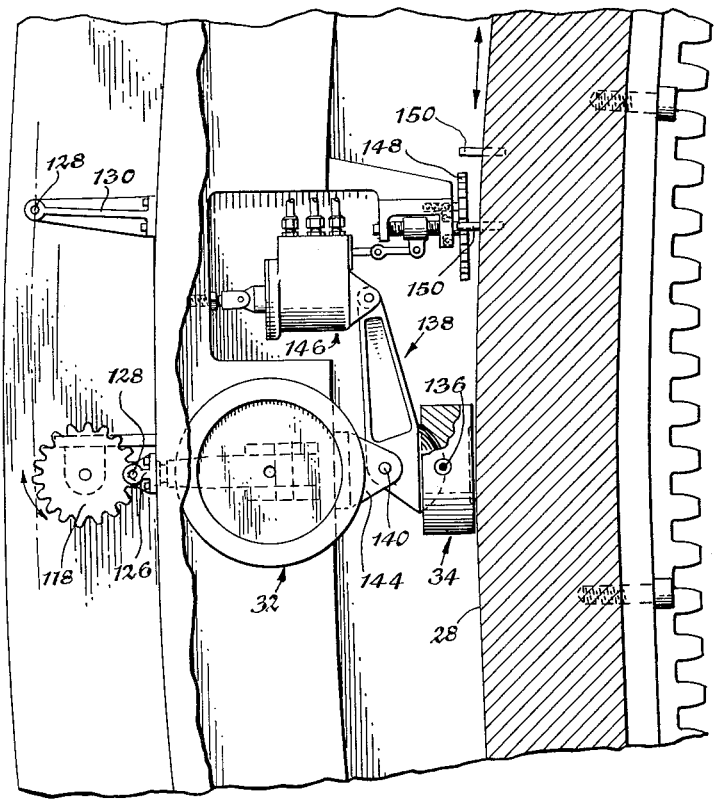
FIG. 4 is a horizontal section taken substantially along the plane of section line 4—4 in FIG. 3 showing further details of the system.

With reference to FIG. 1, a specific adaptation of the bearing system in accordance with the present invention is diagrammatically illustrated therein. In this figure, in dotted lines, there is shown a radar scope installation having a fixed base 10, a superstructure 12 rotatable about a vertical axis relative to the base 10 by means of the bearing assembly indicated generally by reference character 14. Th superstructure 12 carries a yoke assembly indicated generally by the reference character 16 for directly supporting the scope or antenna 18 for rotation about a horizontal axis. It will be readily appreciated that such a mechanism as is shown in FIG. 1 need be so constructed that its movement about the vertical azimuth axis as well as about the horizontal elevation axis will occasion no appreciable error due to displacement or tilting of these axes since the scope will be utilized to detect objects at great distances. To illustrate the major problem involved, the reflector or scope 18 may be of a diameter of 140 feet, the height of the base 10 may in the neighborhood of 130 feet and the diameter of the bearing 14 may be in the order of 40 feet.

The construction of the bearing and its associated system can be seen more clearly in FIG. 3. In this figure, reference character 20 in general designates the upper bearing ring which includes a horizontal flange portion 22 provided on its underside with an annular bearing surface 24 and a vertical flange portion 26 provided on its outer face with a circumferentially extending bearing surface 28. The segmental or sectionalized nature of this upper bearing ring is shown in FIG. 2 wherein it will be seen that the ring is actually composed of a plurality of sections 30 suitably joined in end to end relationship to form an annular bearing structure. Obviously, with a bearing having a diameter of 40 feet, as above, fabrication in sections is required in order to permit transportation of the assembly.

The lower half of the bearing assembly is comprised of a cooperative series of bearing pads indicated generally by the reference character 32 in FIG. 3 operating in conjunction with the bearing surface 24 and a series of bearing pads 34 arranged in circular fashion and cooperable with the bearing surfaces 28. These bearing pads are supported from a lower ring structure indicated generally by the reference character 36 which is mounted directly on a suitable portion of the base 10 as can be clearly seen in FIG. 3. The ring assembly 36, like the upper bearing half 20, is of sectional or segmentalized form and these sections are secured to the base 10 by means of suitable mounting bolts such as the bolts 38. When the sections of the lower rings 36 are assembled onto the base 10, they are disposed in more or less accurately aligned relationship with each other and in horizontal disposition by the use of shim members 40 interposed between the base and the lower surface of the ring sections 36 and at intervals, the base may be provided with abutment members in the form of screw thread elements 42 which engage the under surface of the ring sections and which may be adjusted to effect the final alignment thereof. The ring 36 of the lower bearing half is provided in its section with a circumferentially extending ball bearing groove 44 and the flange portion 28 of the upper bearing half 20 are provided in its sections thereof with a corresponding groove 46 which receives individual ball bearing elements 48 which are adapted to support the structure should the hydrostatic system fail for any reason. It is because of these emergency bearing members 48 that it is desirable to provide a reasonably accurate alignment between the sections of the lower bearing ring 36, that is, in order to assure a more or less uniform groove 44.

To illustrate the principles of the compensating system in accordance with the present invention, the same as associated with the bearing pads 32 will be described in detail. It will be understood that there are a plurality of the bearing pads 32 arranged in circumferentially spaced relationship and cumulatively cooperative with the bearing surface 24 to accurately align and support the upper bearing section 20. Each of these bearing pads is of disc-like configuration and is provided in its upper surface with a dished or depressed portion 50 and with a marginally extending flat 52. By means of connection to a suitable source of hydraulic fluid under pressure, as by the inlet line 54, hydraulic fluid is fed through the passageway 56 to the dished portion 50 of each bearing pad, it being understood that the pressure of the hydraulic fluid is sufficient to maintain separation between the annular flat 52 of each pad and the opposed surface 24 of the upper bearing ring 20. Hydraulic fluid escaping from each bearing pad, as is well understood in connection with hydrostatic bearings, will be returned to the supply side of the hydrostatic fluid system through suitable collection galleys 58 and 60 disposed on either side of the upraised circular rib 62 formed on the several sections of the lower ring 36, and thence to a common passage 64 communicating through the base 10 at intervals therealong to return lines 66.

It will be understood that each bearing pad 32 is supported in floating relationship to the lower bearing portion 36 through the medium of rocker arm assemblies indicated generally by reference character 68. The rocker arms are each provided with a semi-spherical upper surface as at 70 seating in a complemental concavity in the lower face of each bearing pad 32 and each rocker arm assembly is pivotally mounted as by a shaft 72 to a suitable mounting bracket 74 affixed to the upper surface of the rib 62. It is to be noted that the axis of shaft 72 in each case is offset from the center of curvature of the semi-circle surfaces 70 so that movement of the rocker arm assembly 68 about the pivotal axis of the shaft 72 will effect vertical displacement of the associated bearing pad 32, the vertical direction being dependent upon the direction of rotation of the rocker arm 68. In order to effect rotation of the rocker arms, each is provided with a laterally extending lever portion 76 pivotally connected as by trunion shaft 78 to an ear or bracket 80 at the upper end of a combined piston and cylinder and valve assembly indicated generally by the reference character 82.

The piston of this assembly 82 is indicated by reference character 84 and has a depending piston rod portion 86 pivotally connected as at 88 to a suitable anchor member 90 rigid with the lower section 36 as shown. The piston 84, operates in the cylinder 92 and it will be readily apparent that hydraulic fluid fed into the cylinder 92 above the piston 84 will cause the assembly 82 to move vertically upwardly and consequently impart a clockwise rotation to the rocker arm assembly 78. Due to the disposition of the axis of shaft 72, this will impart a vertical upward motion on the associated bearing pad 32. Conversely, fluid introduced into the chamber below the piston 84 will cause the opposite effect.

In order to control the movement of the cylinder 92 and hence the rocker arm assembly 68, the cylinder is provided with a balance valve assembly including a piston 94 operating in the cylinder 96, the cylinder being provided with a pair of return lines 98 and 100 and a common pressure line 102. The piston 94 is provided with a rigid rod 104 which projects upwardly through the cylinder 94 and is pivotally connected as at 106 to a link member 108 in turn pivotally connected as at 110 to a traveling nut member 112 nonrotatably but axially displaceably received on the threaded portion 114 of an actuating shaft.

The actuating shaft is rotatably journalled adjacent its opposite ends in a suitable bearing bracket assembly 116 fixedly supported on the lower ring assembly 36 and has rigidly affixed to its upper end a cam or gear wheel 118. From the above, it will be readily apparent that if the gear 118 is rotated, the nut 112 will be moved upwardly or downwardly to impart similar motion to the piston 94. Assuming that the piston has been moved downwardly, the valve port 120 in cylinder 92 will be uncovered so that the chamber above the piston 84 will be in communication with the outlet line 98 and, similarly, the port 122 in cylinder 92 will be uncovered to establish communication with the chamber below piston 84 and the pressure inlet line 102. This will cause vertical downward movement of the cylinder 92 until the piston 94 has achieved an equilibrium or null position within the cylinder 96 and, of course, in the process, the bearing pad 32 will have been moved vertically downwardly. In order to impart rotation to the gear wheel 118, the flange 22 of the upper bearing half 20 is provided with a series of brackets 126 carrying depending pins 128 disposed so as to engage the gear wheel 118 upon movement of the upper bearing half 20. In FIG. 3, an inboard pin 128 is shown although it is to be understood that outboard pins are also provided and in any case, there will be an equal number of inboard and outboard pins in any installation.

Referring once again to FIG. 2, it will be appreciated that when the sections 30 are assembled, neither the bearing surface 24 nor the bearing surface 28 will be exactly uniform. For example, as indicated by the dotted line 130 in FIG. 2, which is of course much exaggerated, misalignment between the adjacent section and distortions therewithin may readily occur. Thus, in order to achieve a fixed and accurately located vertical axis of rotation, the elevations of the flats 52 of the various bearing pads 32 will have to be different from each other to the extent to accommodate for the non-uniformity and inaccuracy of alignment of the surfaces 24 of the several sections 30. Thus, for any given position of the upper bearing assembly 20 relative to the lower bearing assembly 36, each pad 32 should be located at a specific elevational relationship and such relationship will change for any other given position of the upper bearing section 20 dependent upon the specific degree of non-uniformity or misalignment or distortion in such upper assembly 20. Realizing this, once the section 20 has been assembled at the site of installation, there will be what may be termed a fixed and built in distortion or misalignment of this assembly which will be peculiar and particular to that specific and particular installation. At this time, by means of accurate measuring instruments, the requisite number, grouping and spacing of pins 128 will be provided circumferentially around the upper assembly 20 so as to cause the various bearing pads 32 to achieve their proper elevational dispositions to maintain accuracy of the vertical axis of rotation.

Thus, the precise disposition of and number of pins 128, either inboard or outboard cannot be predetermined and is determined only after the assembly of the upper bearing half 20 at a particular site. As was previously stated, in any case there will be an equal number of inboard and outboard pins 128 since, for every complete revolution of the assembly 20, each individual bearing pad 32 must return to its original position.

Figure 5:
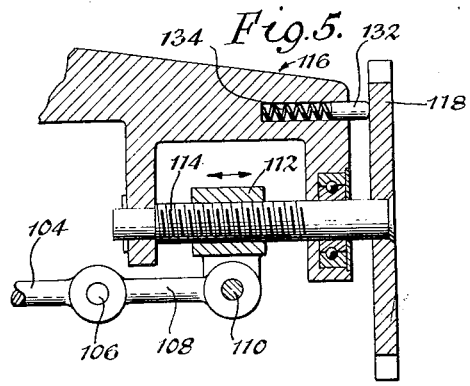
FIG. 5 is an enlarged sectional view taken through one of the compensating cam mechanisms.

FIG. 4 illustrates more clearly the disposition of inboard pins 128. The inboard pin in FIG. 4 will be seen to be carried by the previously mentioned bracket 126 whereas an outboard pin 128 will be seen to be carried by a bracket 130. It will be appreciated that the gear wheel 118 may be of any suitable diameter and number of teeth to achieve the degree of accuracy desired. FIG. 5 will more clearly illustrate the principles of construction of the gear wheel and its associated mechanism. In this figure, it will be appreciated that the gear wheel 118 is provided with a friction means such as a plunger 132 spring urged by the compression spring 134 into contact with the inner side of the gear 118 so as to produce a slight frictional drag thereon so that the same will hold its position after having been incrementally rotated by one of the pins 128.

FIG. 4 also illustrates the cooperative relationship of the bearing pads 34 with the vertical bearing surface 28. Referring also to FIG. 3, it will be appreciated that each of the bearing pads 34 is formed similarly to the bearing pads 32, that is with a central disc or depression portion 134 communicating with the fluid pressure line 136 and that each of these bearing pads 34 is associated with a rocker arm assembly 138 having its pivotal axis 140 offset from the center of curvature of the semi-circle surface 142. The bracket 144 of course corresponds to the bracket 74 previously described. Likewise, the compensating assembly indicated generally by the reference character 146 is identical to the assembly 82 previously described and the gear wheel 148 is so disposed as to be engageable with pins 150 disposed either above or below such gear 148 for achieving the proper direction of rotation of the corresponding gear 148.

Whereas only one specific example of the invention has been described hereinabove it will be understood that various changes may be made therein without departing from the spirit of the invention or the scope of the appended claims.

What is claimed is:

1. A hydrostatic bearing assembly of the type having a large diameter race initially formed in sections and assembled at an installation site, comprising a series of separate bearing pads associated with said race and cooperative therewith to produce an oil film therebetween, whereby said race and said pads may freely rotate relative to each other, mounting means for said bearing pads, and means including mechanism rigid with said race and mechanism rigid with said mounting means responsive to the position of said race relative to said pads to interengage said mechanisms and automatically adjust the pads individually relative to said race to compensate for misalignments and distortions of said race sections.

2. A hydrostatic bearing assembly including a race of relatively large diameter characterized by fabrication-induced undulations in its reaction surface, a series of separate bearing pads arranged pathwise to oppose said reaction surface for the introduction of an anti-friction oil film therebetween, mounting means for said bearing pads, said bearing pads being adjustable relatively to each other to conform to the undulations in said reaction surface, and means including mechanism rigid with said race and mechanism rigid with said mounting means responsive to the position of said race relative to said pads to interact and automatically adjust the pads in accord with the positional change of said undulations.

3. A hydrostatic bearing assembly of the type having a large diameter race initially formed in sections and assembled at an installation site, comprising a series of separate bearing pads associated with said race and cooperative therewith to produce an oil film therebetween, whereby said race and said pads may freely rotate relative to each other, a base member, a plurality of rocker arms pivotally mounted on said base, one for each bearing pad, each rocker arm having a semi-spherical supporting surface having a center of curvature displaced from the pivotal axis thereof, each bearing pad having a semi-spherical concavity receiving the supporting surface of an associated rocker arm, and means including mechanism rigid with said race and mechanism rigid with said mounting means responsive to the position of said race member relative to said pads to interact and pivot said rocker arms to individually adjust the bearing pads thereby to compensate for misalignments and distortions of said race setions.

4. A hydrostatic bearing assembly of the type having a large diameter race initially formed in sections and assembled at an installation site, comprising a series of separate bearing pads associated with said race and cooperative therewith to produce an oil film therebetween, whereby said race and said pads may freely rotate relative to each other, a base member, a plurality of rocker arms pivotally mounted on said base, one for each bearing pad, each rocker arm having a semi-spherical supporting surface having a center of curvature displaced from the pivotal axis thereof, each bearing pad having a semi-spherical concavity receiving the supporting surface of an associated rocker arm, and means responsive to the position of said race member relative to said pads to pivot said rocker arms and individually adjust the bearing pads thereby to compensate for misalignments and distortions of said race sections, said means including a cylinder connected to each rocker arm and a piston in said cylinder anchored to said base member, and means for selectively introducing fluid under pressure on opposite sides of said piston.

5. A hydrostatic bearing assembly including a race of relatively large diameter characterized by fabrication-induced undulations in its reaction surface, a series of separate bearing pads arranged pathwise to oppose said reaction surface for the introduction of an anti-friction oil film therebetween, said bearing pads being adjustable relatively to each other to conform to the undulations in said reaction surface, a base member, a plurality of rocker arms pivotally mounted on said base, one for each bearing pad, each rocker arm having a semi-spherical supporting surface having its center of curvature displaced from the pivotal axis thereof, each bearing pad having a concavity receiving an associated supporting surface, and means including mechanism rigid with said race and mechanism rigid with said mounting means responsive to the position of said race relative to said pads to interact and individually pivot said rocker arms in accord with the positional change of said undulations.

6. A hydrostatic bearing assembly including a race of relatively large diameter characterized by fabrication-induced undulations in its reaction surface, a series of separate bearing pads arranged pathwise to oppose said reaction surface for the introduction of an anti-friction oil film therebetween, said bearing pads being adjustable relatively to each other to conform to the undulations in said reaction surface, a base member, a plurality of rocker arms pivotally mounted on said base, one for each bearing pad, each rocker arm having a semi-spherical supporting surface having its center of curvature displaced from the pivotal axis thereof, each bearing pad having a concavity receiving an associated supporting surface, and means responsive to the position of said race relative to said pads to individually pivot said rocker arms in accord with the positional change of said undulations, said means including a cylinder connected to each rocker arm and a piston in said cylinder anchored to said base member, and means for selectively introducing fluid under pressure on opposite sides of said piston.

7. A hydrostatic bearing assembly including a race of relatively large diameter characterized by fabrication-induced undulations in its reaction surface, a series of separate bearing pads arranged pathwise to oppose said reaction surface for the introduction of an anti-friction oil film therebetween, said bearing pads being adjustable relatively to each other to conform to the undulations in said reaction surface, and means responsive to the position of said race relative to said pads to automatically adjust the latter in accord with the positional change of said undulations, said means including actuating pins fixed to said race at points thereon determined by the character of said fabrication-induced undulations.

References Cited in the file of this patent
UNITED STATES PATENTS

| | | |
|---|---|---|
| 1,445,188 | Wadsworth | Feb. 13, 1923 |
| 2,197,432 | Kingsbury | Apr. 16, 1940 |
| 2,906,571 | Casacci | Sept. 29, 1959 |